United States Patent
Arkadakskiy et al.

(10) Patent No.: US 11,491,439 B2
(45) Date of Patent: *Nov. 8, 2022

(54) METHOD FOR REDUCING ENERGY AND WATER DEMANDS OF SCRUBBING $CO_2$ FROM $CO_2$-LEAN WASTE GASES

(71) Applicant: SAUDI ARABIAN OIL COMPANY, Dhahran (SA)

(72) Inventors: Serguey Viktorov Arkadakskiy, Edmonton (CA); Noushad Kunnummal, Louisville, KY (US); Zeyad Tareq Ahmed, Chassess, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,119

(22) Filed: Feb. 19, 2021

(65) Prior Publication Data
US 2021/0178317 A1    Jun. 17, 2021

Related U.S. Application Data

(63) Continuation-in-part of application No. 16/505,378, filed on Jul. 8, 2019, now Pat. No. 11,155,462.
(Continued)

(51) Int. Cl.
*B01D 53/14* (2006.01)
*B01D 53/18* (2006.01)
(Continued)

(52) U.S. Cl.
CPC ..... *B01D 53/1475* (2013.01); *B01D 53/1431* (2013.01); *B01D 53/1462* (2013.01);
(Continued)

(58) Field of Classification Search
CPC ....... C01B 32/50; C01B 3/36; C01B 2203/86; C01B 2203/0233; C01B 2203/025;
(Continued)

(56) References Cited

U.S. PATENT DOCUMENTS

| | | |
|---|---|---|
| 11,155,462 B2 * | 10/2021 | Arkadakskiy ....... E21B 41/0064 |
| 2004/0200393 A1 | 10/2004 | Zauderer |
| 2009/0020410 A1 | 1/2009 | Niwa et al. |
| 2009/0232861 A1 | 9/2009 | Wright et al. |

(Continued)

FOREIGN PATENT DOCUMENTS

| WO | 2010102385 A1 | 9/2010 |
|---|---|---|
| WO | 2020234464 A1 | 11/2020 |

OTHER PUBLICATIONS

"Capture of CO2 Using Water Scrubbing", Report No. PG3/26, IEA Greenhouse Gas R&D Programme, Jul. 2000 (81 pages).
Gíslason, Sigurdur R. et al., "A brief history of CarbFix: Challenges and victories of the project's pilot phase", International Carbon Conference 2018, Energy Procedia, ScienceDirect, Elsevier Ltd., vol. 146, Sep. 2018, pp. 103-114 (12 pages).
(Continued)

*Primary Examiner* — Jafar F Parsa
(74) *Attorney, Agent, or Firm* — Osha Bergman Watanabe & Burton LLP

(57) ABSTRACT

Methods and systems for reducing greenhouse gas emissions, including producing a waste gas stream comprising form greater than 0 vol % to less than 20 vol %, inclusive, carbon dioxide, pre-concentrating the waste gas stream to increase a concentration of carbon dioxide, producing a concentrated byproduct stream comprising more than 40 vol %, dissolving carbon dioxide contained in the concentrated byproduct stream in water, producing a dissolved byproduct stream and an undissolved byproduct stream, injecting the dissolved byproduct stream or a portion thereof into a reservoir containing mafic rock, and allowing components of the dissolved byproduct stream to react in situ with components of the mafic rock to precipitate and store components of the byproduct stream in the reservoir.

14 Claims, 2 Drawing Sheets

Related U.S. Application Data

(60) Provisional application No. 62/830,945, filed on Apr. 8, 2019.

(51) Int. Cl.
  B01D 53/62 (2006.01)
  B01D 53/78 (2006.01)
  E21B 43/16 (2006.01)

(52) U.S. Cl.
  CPC ..... B01D 53/1468 (2013.01); B01D 53/1481 (2013.01); B01D 53/1493 (2013.01); B01D 53/18 (2013.01); B01D 53/62 (2013.01); B01D 53/78 (2013.01); E21B 43/164 (2013.01); *B01D 2252/103* (2013.01); *B01D 2257/504* (2013.01); *B01D 2258/02* (2013.01)

(58) Field of Classification Search
  CPC ....... C01B 2203/068; C01B 3/48; C01C 1/04; B65G 5/00; E21B 41/0064
  See application file for complete search history.

(56) References Cited

U.S. PATENT DOCUMENTS

| | | |
|---|---|---|
| 2012/0058042 A1 | 3/2012 | Zauderer |
| 2020/0316515 A1 | 10/2020 | Arkadakskiy et al. |
| 2020/0317513 A1 | 10/2020 | Arkadakskiy et al. |

OTHER PUBLICATIONS

Gunnarsson, Ingvi et al., "The rapid and cost-effective capture and subsurface mineral storage of carbon and sulfur at the CarbFix2 site", International Journal of Greenhouse Gas Control, ScienceDirect, Elsevier Ltd., vol. 79, Oct. 2018, pp. 117-126 (10 pages).

Snæbjörnsdóttir, Sandra et al., "Carbon dioxide storage through mineral carbonation", Nature Reviews: Earth & Environment, vol. 1, Feb. 2020, pp. 90-102 (13 pages).

International Search Report Issued in Corresponding Application No. PCT/US2022/015723, dated May 23, 2022, 5 pages.

Written Opinion Issued in Corresponding Application No. PCT/US2022/015723, dated May 23, 2022, 6 pages.

* cited by examiner

METHOD FOR REDUCING ENERGY AND WATER DEMANDS OF SCRUBBING $CO_2$ FROM $CO_2$-LEAN WASTE GASES

CROSS REFERENCE TO RELATED APPLICATIONS

This application is a continuation-in-part of U.S. patent application Ser. No. 16/505,378 filed Jul. 8, 2019, which claims priority to U.S. Provisional Patent Application Ser. No. 62/830,945 filed on Apr. 8, 2019. These applications are incorporated by reference herein.

FIELD OF THE DISCLOSURE

Embodiments of the disclosure relate to carbon capture from various $CO_2$ emission sources, including those lean in carbon dioxide, such as may be produced at a power generation facility, as well as those rich in carbon dioxide, such as may result during hydrogen production. Embodiments of the disclosure relate to synergistic hydrogen production and carbon capture. In particular, embodiments of the disclosure relate to hydrogen production from fossil fuels with substantially no greenhouse gas emissions due to carbon capture via mafic rock, for example basalts. In other aspects, embodiments of the disclosure relate to carbon dioxide capture via mafic rock, for example basalts.

BACKGROUND

Hydrogen or $H_2$ is an environmentally-friendly fuel which has the potential to replace greenhouse gas emitting hydrocarbon fuels. For example, hydrogen can be used to power fuel cells. Nearly all $H_2$ currently produced, greater than about 95%, is derived from hydrocarbons, and predominantly from natural gas. Waste $CO_2$ released to the atmosphere (between about 7 and 12 tons $CO_2$ per ton of $H_2$ produced) partially negates the "clean fuel" benefits of $H_2$. To mitigate the carbon footprint of $H_2$ production, economically-impractical methods and systems have been proposed for $H_2$ production combined with capturing, compressing to a liquid, and injecting co-produced $CO_2$ into deep (greater than about 850 m underground) sedimentary rock reservoirs in a process known as carbon capture and storage ("CCS"). However, conventional CCS adds significant cost to an already highly-energy-consuming $H_2$ production process, thus rendering the combined technology unfeasible under current market and regulatory conditions.

Previously-proposed combinations of $H_2$ production from hydrocarbons with conventional CCS of $CO_2$, for example in depleted hydrocarbon reservoirs or saline groundwater aquifers, adds significant costs associated with purification, compression, transportation, and injection of $CO_2$. A number of energy-consuming steps are employed to ensure high purity of $CO_2$ (greater than about 98 mol %) needed to meet the requirements of conventional CCS. And, since standard pressure swing adsorption ("PSA") $H_2$—$CO_2$ separation technology alone does not produce $CO_2$ of sufficient quality and purity for CCS, further purification involving acid gas absorbing reagents, such as Selexol™ (for heavy and solid hydrocarbons) and methyl diethanolamine (MDEA), is needed.

Safe and economic transportation, as well as the injection and long-term storage of $CO_2$ in conventional CCS, depends upon $CO_2$ being compressed to a supercritical (liquid) state, which also adds significant cost. Consequently, underground $CO_2$ storage reservoirs must be located at least about 850 vertical meters below the ground surface to ensure that there is sufficient pressure to keep $CO_2$ in a liquid state, thus adding to the cost of the injection and disposal wells.

Since $CO_2$ in conventional CCS could remain in a liquid and/or compressed gas state for hundreds or thousands of years, sophisticated long-term monitoring programs are needed to ensure that $CO_2$ is truly confined to a given CCS reservoir and does not migrate to overlying aquifers or the surface.

Similar to that described above, WO2020/234464 describes a process of obtaining very pure $CO_2$ and/or $H_2S$, pressurizing the $CO_2$ and/or $H_2S$, pumping the pressurized $CO_2$ and/or $H_2S$ and pressurized water downhole, dissolving the pressurized $CO_2$ and/or $H_2S$ and pressurized water within the wellbore, and trapping the mixture in the formation. As the pressurized gases and water are pumped downhole before being brought into contact with each other, such processes assume that all the gases are dissolved in the water. Indeed, in a relatively short time period, i.e., less than a couple of years, all of the $CO_2$ is dissolved and trapped in the formation. The process of separating and purification of the $CO_2$ prior to injection is very costly.

SUMMARY OF THE CLAIMED EMBODIMENTS

The present disclosure presents systems and methods for efficient carbon capture.

In some embodiments, embodiments relate to production of hydrogen from hydrocarbon fossil fuels with little to no greenhouse gas emissions. In some embodiments, the first step of the method is co-production of $H_2$ and waste or byproduct $CO_2$ from gaseous, liquid, or solid hydrocarbons (for example steam reforming of natural gas). The co-production of $H_2$ and $CO_2$ from hydrocarbons can be accomplished in various processes. In a second step of the method, $CO_2$ is injected into reactive mafic or ultramafic rocks, where $CO_2$ and/or other waste gases are permanently immobilized as precipitated carbonate minerals. The term mafic generally describes a silicate mineral or igneous rock that is rich in magnesium and iron. Mafic minerals can be dark in color, and rock-forming mafic minerals include olivine, pyroxene, amphibole, and biotite. Mafic rocks include basalt, diabase, and gabbro. Chemically, mafic rocks can be enriched in iron, magnesium, and calcium.

In embodiments of systems and methods, produced hydrogen can be converted reversibly to ammonia for safe storage and transportation in a reduced volume. The versatility of the present carbon capture and storage ("CCS") systems and methods also allows $CO_2$ from other sources such as refining, power production, and desalinization to be immobilized economically, for example in basaltic rock.

To increase the efficiency of synergistic $H_2$ production with $CO_2$ removal, $H_2$ production occurs preceding an alternative CCS process in which $CO_2$ is injected into natural geological sinks comprised of reactive basaltic and ultramafic lithologies, where it rapidly reacts to form stable mineral phases, such as precipitated carbonates. Carbon storage in basalts ("CSB") consumes significantly less energy than other CCS systems and processes, has advantageously high tolerance to acid gas impurities (i.e., $H_2S$), does not require deep wells, such as those 850 m deep or deeper, and does not require long-term reservoir monitoring.

Storage of $CO_2$ in basaltic and ultramafic rocks is unique compared to conventional CCS, because it relies in part on rapidly proceeding chemical reactions which convert $CO_2$ gas to solids, rather than relying on physical storage of $CO_2$ itself over time. Economic estimates demonstrate the cost for one metric ton of $CO_2$ captured by presently disclosed systems and methods is about two to four times lower as compared to conventional CCS.

In some embodiments, low purity $CO_2$ gas is dissolved in water prior to or during injection into a basalt-containing reservoir, and this avoids difficulties including compressing and maintaining $CO_2$ in a liquid state. Having $CO_2$ dissolved in an aqueous phase helps avoid the need for drilling deep disposal wells deeper than about 850 m below the surface, as is required in conventional CCS. In other words, significantly lower pressures are needed to keep sufficient quantities of $CO_2$ dissolved in water, and injection zones can be as shallow as 350 vertical meters below surface for embodiments of the present disclosure.

Rapid immobilization of $CO_2$ as solid, stable carbonate minerals not only ensures permanent removal of $CO_2$ from the environment, but also precludes the need for sophisticated monitoring programs needed at conventional CCS sites. Extreme tolerance of the present technology to the presence of up to about 40 mol % of other water soluble waste gases such as $H_2S$, which like $CO_2$ is rapidly and substantially completely mineralized in basalts and ultramafics, also has important efficiency implications.

CSB negates the need for expensive and energy consuming steps to remove sulfur/$H_2S$ impurities from $CO_2$ and other gases produced during $H_2$ production. Another important advantage is that in contrast to liquid $CO_2$, which is less dense than reservoir water and thus buoyant, $CO_2$-rich water has higher density than ambient groundwater. Consequently, when injected $CO_2$-rich water will sink in the reservoir rather than move upwards, which eliminates the need of a caprock—a critically important geological feature of all conventional CCS reservoirs. In embodiments of the present disclosure, injection and storage of $CO_2$ in basalts and mafics has no impact on the quality of groundwater residing in those lithologies. This is particularly important when such aquifers are used to supply drinking water or water for other purposes.

Therefore, disclosed here is a method for producing hydrogen substantially without greenhouse gas emissions, the method including producing a product gas comprising hydrogen and carbon dioxide from a hydrocarbon fuel source; separating hydrogen from the product gas to create a hydrogen product stream and a byproduct stream; injecting the byproduct stream into a reservoir containing mafic rock; and allowing components of the byproduct stream to react in situ with components of the mafic rock to precipitate and store components of the byproduct stream in the reservoir.

In some embodiments, the mafic rock comprises basaltic rock. In other embodiments, before the step of injecting the byproduct stream into the reservoir, the byproduct stream is further treated to separate and purify $CO_2$ from other components to increase $CO_2$ concentration of the byproduct stream for injection into the reservoir. Still other embodiments of the method further comprise the step of liquefying $CO_2$ in the byproduct stream for injection into the reservoir. In some embodiments, the method includes the step of mixing the byproduct stream with water, the byproduct stream comprising $H_2S$. In some embodiments, the method includes the step of reacting the separated hydrogen with nitrogen to form compressed liquid ammonia. Still other embodiments include the steps of transporting the compressed liquid ammonia and returning the compressed liquid ammonia to hydrogen and nitrogen via electrolysis for use of hydrogen as a hydrogen fuel source.

In still yet other embodiments, the step of producing a product gas includes steam reforming or partial oxidation. In certain embodiments, the step of allowing components of the byproduct stream to react in situ with components of the mafic rock to precipitate produces precipitates selected from the group consisting of: calcium carbonates, magnesium carbonates, iron carbonates, and combinations thereof. Still in other embodiments, the reservoir is between about 250 m and about 500 m below the surface and is between about 150° C. and about 280° C., or less. In other embodiments, the reservoir is between about 350 m and about 1,500 m below the surface and is less than about 325° C.

Additionally disclosed here is a system for producing hydrogen substantially without greenhouse gas emissions, the system including a hydrogen production unit with a hydrocarbon fuel inlet operable to produce a product gas comprising hydrogen and carbon dioxide from hydrocarbon fuel; a hydrogen separation unit operable to separate hydrogen from the product gas to create a hydrogen product stream and a byproduct stream; and an injection well operable to inject the byproduct stream into a reservoir containing mafic rock to allow components of the byproduct stream to react in situ with components of the mafic rock to precipitate and store components of the byproduct stream in the reservoir. In some embodiments, the mafic rock comprises basaltic rock. In other embodiments, the system includes a byproduct treatment unit to treat the byproduct stream to separate and purify $CO_2$ from other components and to increase $CO_2$ concentration of the byproduct stream for injection into the reservoir.

Still in other embodiments, the system includes a compressor to liquefy $CO_2$ in the byproduct stream for injection into the reservoir. In certain embodiments, the system includes a mixing unit to mix the byproduct stream with water, the byproduct stream comprising $H_2S$. Still in other embodiments, the system includes a reaction unit to react the separated hydrogen with nitrogen to form compressed liquid ammonia. In certain embodiments, the system includes a transportation unit to transport the compressed liquid ammonia and return the compressed liquid ammonia to hydrogen and nitrogen via electrolysis for use of hydrogen as a hydrogen fuel source.

Still in other embodiments, the hydrogen production unit includes a steam reformer or partial oxidation reactor. In some embodiments, components of the produced byproduct stream react in situ with components of the mafic rock to precipitate products selected from the group consisting of: calcium carbonates, magnesium carbonates, iron carbonates, and combinations thereof. In certain embodiments, the reservoir is between about 250 m and about 500 m below the surface and is between about 150° C. and about 280° C. Still in other embodiments, the reservoir is between about 350 m and about 1,500 m below the surface and is less than about 325° C.

In some embodiments disclosed herein is a method for reducing greenhouse gas emissions. The method including producing a waste gas stream comprising between 0 and 40 vol %, inclusive, carbon dioxide, pre-concentrating the waste gas stream to increase a concentration of carbon dioxide, producing a concentrated byproduct stream comprising 40 vol % to 75 vol % carbon dioxide, dissolving carbon dioxide contained in the concentrated byproduct stream in water, producing a dissolved byproduct stream and an undissolved byproduct stream, injecting the dissolved byproduct stream or a portion thereof into a reservoir containing mafic rock, and allowing components of the dissolved byproduct stream to react in situ with components of the mafic or ultramafic rocks to precipitate and store components of the byproduct stream in the reservoir.

In another embodiments disclosed herein is a system for reducing greenhouse gas emissions. The system including a facility configured to produce a waste gas stream comprising from 0 vol % to 40 vol % carbon dioxide, inclusive, a pre-concentrator configured for increasing a concentration of carbon dioxide in the waste gas stream, producing a concentrated byproduct stream, a water dissolution system configured for dissolving the carbon dioxide in water, producing a dissolved byproduct stream and an undissolved byproduct stream, and an injection well operable to inject the dissolved byproduct stream into a reservoir containing mafic rock to allow components of the concentrated byproduct stream to react in situ with components of the mafic or ultramafic rocks to precipitate and store components of the byproduct stream in the reservoir.

In another embodiment disclosed herein is a method for sequestering $CO_2$. The method including producing a product gas comprising carbon dioxide and one or more selected from the group consisting of $H_2S$, $SO_2$, Ar, and $N_2$ from a hydrocarbon fuel source, pre-concentrating the product gas in a pre-concentrator to increase a concentration of carbon dioxide from less than 20 vol % to above 40 vol %, producing a concentrated byproduct stream, dissolving the concentrated byproduct stream in water, producing a dissolved byproduct stream comprising water, $CO_2$, and any dissolved $H_2S$ and/or $SO_2$, and injecting the dissolved byproduct stream into a reservoir containing mafic or ultramafic rocks, and allowing the $CO_2$ and any $H_2S$ and $SO_2$ to react in situ with components of the mafic rock to precipitate and store components of the byproduct stream in the reservoir.

BRIEF DESCRIPTION OF DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
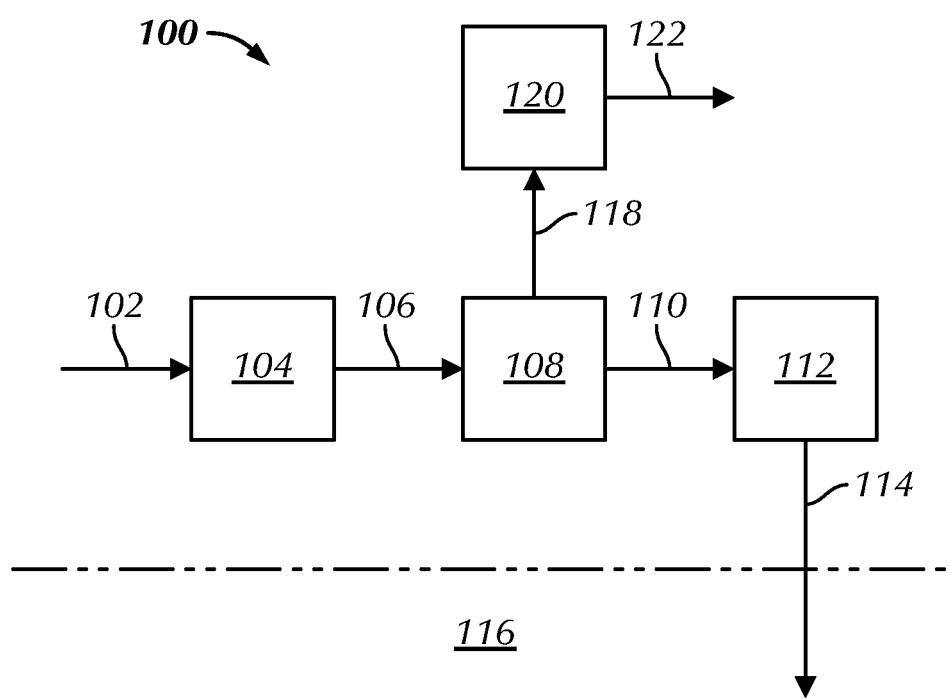
FIG. 1 shows a schematic flow chart for an example embodiment of a system for simultaneous $H_2$ production, $H_2$ transport, and $CO_2$ sequestration for producing $H_2$ from hydrocarbons with near zero greenhouse gas emissions.

So that the manner in which the features and advantages of the embodiments of systems and methods of $H_2$ production from hydrocarbons with near zero greenhouse gas emissions, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The production of $H_2$ from hydrocarbons using technologies such as steam-reforming or partial oxidation/gasification includes three steps. In steam reforming, hydrocarbons, for example methane, are heated in the presence of $H_2O$ (steam) and catalysts to release raw syngas consisting of hydrogen ($H_2$), carbon monoxide (CO), small amounts of carbon dioxide ($CO_2$), and/or other impurities as shown in Equations 1 and 2:

$$CH_4 + H_2O \leftrightarrow CO + 3H_2 \qquad \text{Eq. 1}$$

and/or $$C_nH_m + nH_2O \leftrightarrow nCO + (n+0.5\,m)H_2 \qquad \text{Eq. 2}$$

The raw syngas is then treated to remove sulfur compounds and/or purified further. $H_2$ yield is then maximized by reacting the raw syngas with $H_2O$ steam in the presence of catalyst to produce $H_2$ and $CO_2$ according to Equation 3:

$$CO + H_2O \rightarrow CO_2 + H_2 \qquad \text{Eq. 3}$$

This is known as a water-gas shift reaction, hence the product is called "shifted" syngas. In partial oxidation, hydrocarbons are reacted with small (non-stoichiometric) amounts of oxygen ($O_2$) to produce raw syngas consisting of $H_2$ and CO according to Equation 4:

$$CH_4 + \tfrac{1}{2}O_2 \rightarrow CO + 2H_2 \qquad \text{Eq. 4}$$

This raw syngas also contains minor amounts of $CO_2$ and/or nitrogen ($N_2$, if air was used instead of pure $O_2$). The raw syngas is then purified, and its $H_2$ content maximized by the reaction of Equation 3. The composition of an example shifted syngas produced by both processes (steam reforming and partial oxidation) is presented in Table 1:

TABLE 1

| Example shifted syngas composition from steam reforming or partial oxidation. | | | | | | | | |
|---|---|---|---|---|---|---|---|---|
| Component | $H_2$ | CO | $CO_2$ | $N_2$ | $O_2$ | Ar | $H_2S$ | $H_2O$ | Other |
| Mol % | 40.9 | 1 | 29.8 | 2.4 | 0 | 0.4 | 0.01 | 25.4 | 0.11 |

Following water-gas shift, $H_2$ is purified by separation from $CO_2$ and other impurities by processes that employ adsorption, absorption, and/or membrane filtration. One example process is Pressure Swing Adsorption ("PSA"), which uses pressure-dependent selective adsorption properties of materials such as activated carbon, silica, and zeolites. Waste or byproduct $CO_2$ and other impurities separated from $H_2$ during PSA are then vented to the atmosphere. Unfortunately, if a conventional CCS scheme were to be used to sequester $CO_2$, then the $CO_2$ must be purified further and compressed to a liquid (supercritical) state for transportation and injection in a deep reservoir. Both steps, however, are avoided (or simplified significantly) here when CSB is applied instead.

While conventional CCS relies predominantly on physical processes such as the injection and storage of single phase liquid $CO_2$ in non-reactive rock reservoirs (e.g., sandstone, limestone), CSB relies on the naturally occurring chemical reactions between $CO_2$ and mafic and ultramafic rocks to precipitate solid carbonates. Reactions include the following: first $CO_2$ dissolves in and reacts with water (either or both water supplied with $CO_2$ gas at the surface or water present in situ in a mafic reservoir) to form a week carbonic acid as shown in Equations 5-7:

$$CO_2 + H_2O \leftrightarrow H_2CO_{3(aq)} \quad \text{Eq. 5}$$

$$H_2CO_3 \leftrightarrow HCO_3^- + H^+ \quad \text{Eq. 6}$$

$$HCO_3^- \leftrightarrow CO_3^{2-} + H^+ \quad \text{Eq. 7}$$

Acidified water dissolves Ca, Fe, and Mg-rich silicate phases (minerals and/or volcanic glass) which results in the release of divalent metal ions in solution according to Equation 8:

$$(Mg,Fe,Ca)_2SiO_4 + 4H^+ \rightarrow 2(Mg,Fe,Ca)^{2+} + 2H_2O + SiO_{2(aq)} \quad \text{Eq. 8}$$

$CO_3^{2-}$ formed during the reaction shown in Equation 7 reacts with the divalent metal cations leading to the precipitation of carbonate minerals as shown in Equation 9:

$$(Ca,Mg,Fe)^{2+} + CO_3^{2-} \rightarrow (Ca,Mg,Fe)CO_3 \quad \text{Eq. 9}$$

Geochemical reaction-transport modeling demonstrates that mineral phases (for example calcite, siderite, and magnesite) will remain stable under prevailing subsurface conditions, hence safely removing $CO_2$ from the atmosphere for hundreds of thousands to millions of years. Other carbonate minerals include ankerite Ca[Fe, Mg, Mn](CO_3)_2. In addition, CSB has extreme tolerance for other water soluble acid gas impurities (e.g. $H_2S$, which is also mineralized as sulphides). Such an advantageous quality not only simplifies the process further, eliminating the need to remove those impurities from a gas mixture exiting an $H_2$ production process, but it also allows for simultaneous sequestering of all other $H_2O$ soluble gas contaminants capable of forming stable mineral phases by reacting with basalts/ultramafics.

$CO_2$ dissolution in water for CSB can be achieved by either: a) separately injecting $CO_2$ and water in the tubing and annular space of injector wells and allowing these to mix at or below about a 350 m depth in the wellbore prior to entering the reservoir; or b) dissolving $CO_2$ and water at the surface in a pressurized vessel and then injecting the solution in a basalt/ultramafic reservoir. While the first method generally applies to pure $CO_2$ and/or a mixture of $CO_2$ and other water soluble acid gases, the latter method is used to effectively separate $CO_2$ (and other water soluble gases) from insoluble or weekly soluble impurities, and can therefore be used to process complex flue gas mixtures (e.g. shifted syngas).

Due to certain thermodynamic constraints of $CO_2$ dissolution in water, both methods require about 27 tons of $H_2O$ per 1 ton of $CO_2$ sequestered. In areas where water is in short supply, CSB may be done by injecting supercritical (liquid) $CO_2$ in basalts or ultramafics; however, this would increase energy demands due to the need for liquefying $CO_2$ via compression.

The solubility of $CO_2$ and other waste gases in water is proportional to their fraction in waste gas mixtures. As a result, water scrubbing of $CO_2$ from $CO_2$-lean mixtures, such as those found in stack emissions from power generation plants, desalination plants, cement plants, etc., can render CSB less cost effective. A thermodynamic calculation shows that, at optimal conditions (i.e., 100 vol % $CO_2$ and freshwater as a carrier fluid), the amount of water needed to dissolve one ton of pure $CO_2$ at a pressure of 35 bar and a temperature of 25° C. is 19 tons (see Table 1).

TABLE 1 quantity of fresh water (in tons) needed to dissolve one ton of $CO_2$ at 25° C. as a function of the pressure and fraction (% vol) of $CO_2$ in the gas mixture.

| Pressure, bar | $CO_2$ Content of gas (mol percent or approximately volume percent) | | | | | | |
|---|---|---|---|---|---|---|---|
| | 100 | 80 | 60 | 40 | 20 | 10 | 5 |
| 2 | 331.3 | 414.1 | 552.2 | 828.2 | 1656.5 | 3313.0 | 6626.0 |
| 5 | 132.5 | 165.6 | 220.9 | 331.3 | 662.6 | 1325.2 | 2650.4 |
| 10 | 66.3 | 82.8 | 110.4 | 165.6 | 331.3 | 662.6 | 1325.2 |
| 15 | 44.2 | 55.2 | 73.6 | 110.4 | 220.9 | 441.7 | 883.5 |
| 20 | 33.1 | 41.4 | 55.2 | 82.8 | 165.6 | 331.3 | 662.6 |
| 25 | 26.5 | 33.1 | 44.2 | 66.3 | 132.5 | 265.0 | 530.1 |
| 30 | 22.1 | 27.6 | 36.8 | 55.2 | 110.4 | 220.9 | 441.7 |
| 35 | 18.9 | 23.7 | 31.6 | 47.3 | 94.7 | 189.3 | 378.6 |
| 40 | 16.6 | 20.7 | 27.6 | 41.4 | 82.8 | 165.6 | 331.3 |
| 45 | 14.7 | 18.4 | 24.5 | 36.8 | 73.6 | 147.2 | 294.5 |
| 50 | 13.3 | 16.6 | 22.1 | 33.1 | 66.3 | 132.5 | 265.0 |

Water demand, however, will increase significantly if $CO_2$ is to be scrubbed from complex waste gas mixtures. This is because $CO_2$ solubility in water is proportional to its partial pressure (or concentration) in the mixture. For example, given the same pressure and temperature conditions (i.e. 35 bar and 25° C.) the amount of water required to scrub one ton of $CO_2$ from a $N_2$—$CO_2$ mixture containing 40 vol % $CO_2$ will be 47.3 tons. If the $CO_2$ concentration in the mixture drops to 10 vol % however, which is the typical $CO_2$ content of a flue gas stream from a conventional power plant, the quantity of water needed to scrub one ton of $CO_2$ will be 189.3 tons or greater. Therefore, the water and/or energy demands for scrubbing $CO_2$ from $CO_2$-lean gas mixtures is high and potentially limiting to the applicability of CSB in such cases. While conditions of 35 bar and 25° C. are noted above, other scrubbing conditions may also be used, and may vary depending upon the feed gas composition. For example, pressure and temperature can be as high as that which $CO_2$ will turn supercritical.

With respect to the produced $H_2$, conventionally $H_2$ is stored and transported as a liquid at a temperature of about −253° C., which requires special double-walled isolated vessels and/or constant refrigeration. However, reversible chemical conversion of $H_2$ into liquid ammonia ($NH_3$) allows storage and transportation of $H_2$ at low pressure and ambient temperatures, at greatly reduced volumes. The reversible $H_2$ to $NH_3$ storage and transport method is inherently safer and advantageous, in particular where large volumes of $H_2$ are to be stored and transported.

Due to high tolerance of CSB to impurities in the $CO_2$ stream (such as $H_2S$ and other gases), $CO_2$-rich tail gases from other sources such as refining, power production, and desalinization could, after limited treatment, be either added to the principal waste stream or independently injected into reactive lithologies for permanent immobilization and disposal.

Unexpected and surprising advantages of simultaneously producing $H_2$ from hydrocarbons while using CSB for permanent $CO_2$ immobilization in basalts and ultramafics include significantly lower predicted energy usage and cost due to: lower energy consumption and lower well costs because there is no requirement to compress and liquefy the $CO_2$; lower complexity of operations due to high tolerance to impurities in the $CO_2$ stream; simultaneous removal of $H_2S$ along with $CO_2$ in the reservoirs via precipitation as solids; no need for a reservoir caprock; and no need for sophisticated long-term monitoring programs. There is no need to liquefy $CO_2$ when it is dissolved in water either at the surface or in the wellbore, but it would be liquefied if directly injected in the subsurface as supercritical fluid.

FIG. 1 shows a schematic flow chart for an example embodiment of a system for simultaneous $H_2$ production, $H_2$ transport, and $CO_2$ sequestration for producing $H_2$ from hydrocarbons with near zero greenhouse gas emissions. In system 100, a hydrocarbon inlet 102 provides a hydrocarbon source, for example natural gas, to a hydrogen production system 104. Hydrogen production system 104 might include steam reforming or partial oxidation, and water-gas shift reactions, for example as described in Equations 1-4. Production gases exit via outlet 106 to a separation unit 108. Separation unit 108 is operable to separate hydrogen from $CO_2$ and other byproducts, and can include for example one or more absorption units, adsorption units, membrane separation units, or any suitable separation technology for separating $H_2$ from $CO_2$ and other product gases, such as for example acid gases.

$CO_2$ and additional gases, such as acid gases, exit separation unit 108 via outlet 110 and can optionally proceed to a further $CO_2$ purification and liquidification unit 112, but need not to. In the case of further $CO_2$ purification and liquidification unit 112, liquefied $CO_2$ is injected into basaltic formation 116 via injection well 114 to form solid precipitated metal carbonates per Equations 5-9. Without optional further $CO_2$ purification and liquidification unit 112, $CO_2$ and additional gases such as acid gases exit separation unit 108 via outlet 110 and proceed directly into basaltic formation 116 via injection well 114 to form solid precipitated metal carbonates per Equations 5-9. $CO_2$ can be mixed with water as a gas at the surface or in situ in basaltic formation 116, or both. Solid carbonate nodules form in vugs and veins in basalt around injection wells and extending outwardly from the injection wells.

Rates of basalt dissolution and mineral carbonation reactions can increase with increasing temperature, and thus higher temperature basaltic reservoirs may be advantageous, while deep reservoirs beyond about 350 m are not required because high pressures are not required to keep $CO_2$ in a pressurized or liquid state. An example suitable reservoir temperature is about 185° C., or for example between about 150° C. and about 280° C. As explained, injected $CO_2$, either by itself or with other gases, creates an acidic environment with water near the injection well, such as injection well 114. Near injection well 114, the acidic fluids remain undersaturated with respect to basaltic minerals and volcanic glass.

Undersaturation and acidity leads to dissolution of host rock basalts in the vicinity of injection wells, such as injection well 114. Mineralization then mostly occurs at a distance away from the injection well (which allows continuous injection of $CO_2$ in a reservoir such as basaltic formation 116), after heat exchange and sufficient dissolution of host basaltic rock neutralizes the acidic water and saturates the formation water with respect to carbonate and sulfur minerals.

Hydrogen exits separation unit 108 at outlet stream 118 to proceed to reaction unit 120 where hydrogen is reacted with nitrogen to form ammonia ($NH_3$). Ammonia exits reaction unit 120 at outlet 122 for reduced volume transport of $H_2$ as $NH_3$. Reaction unit 120 can include a pressurized multistage ammonia production system (PMAPS) to produce ammonia in a pressurized liquid phase. Pressurized liquid $NH_3$ can be transported by a pressurized tanker truck, and using an $NH_3$ electrolyzer, $NH_3$ can be reversibly returned to $N_2$ and $H_2$ wherever hydrogen is required.

The above was found to be effective for processes that produce $H_2$ and have a high concentrations of $CO_2$ in the byproduct streams (40 vol %+), such as may be produced via gasification and other processes noted. The processing of the hydrogen-containing streams in adsorptive and other processes focused on recovering the hydrogen permits CSB of the $CO_2$ byproduct, as described in various embodiments above.

However, it has also been found that $CO_2$ may be effectively and efficiently sequestered from other various product and waste streams, including $CO_2$-lean streams from facility is selected from the group consisting of a power production facility, a desalination plant, a refinery, a chemical production plant, an ore smelting plant, a cement production plant, a logging plant, a landfill, a fertilizer production plant, and other industrial facilities, among others. In some embodiments, the $CO_2$-lean stream may have other gas components which may also be handled by the process and system of one or more embodiments disclosed herein. For example, the $CO_2$-lean stream may have $N_2$, Ar, $SO_2$, $H_2S$, or other inert gases or acid gases. Inert gases may ultimately be vented to atmosphere while $CO_2$ and other acid gases may ultimately be sequestered. The $CO_2$-lean streams that may be processed according to embodiments herein may have a $CO_2$ concentration of less than 40 vol %. Embodiments herein may also effectively sequester $CO_2$ from very lean streams, such as a flue gas or other waste streams having, for example, from 4 vol % to 12 vol % $CO_2$. While it is not routine, arguably not even contemplated in the art to sequester $CO_2$ from such lean streams, by using water solubility trapping for storage in basalts or other reactive rocks, embodiments herein may be used to initially enhance the $CO_2$ concentration of the waste stream and then effectively dissolve the $CO_2$ and other acid gases in water, and providing the mixture of $CO_2$ and water for injection into a well.

The $CO_2$ concentration of the $CO_2$-lean stream may be less than 5, 7, 10, 15, 20, 25 or 30 vol % before pre-concentration, and may be concentrated to above 35, 40, 45, 50, 55, 60, or 70 vol %, where any lower limit may be combined with any appropriate upper limit. While waste streams may have a broad range of $CO_2$ concentrations, the CSB has been found to effective where the waste stream is initially pre-concentrated to a $CO_2$ concentration above 35, 40, or 45 vol %. Additionally, gas streams having higher initial concentrations than those listed above may be pre-concentrated according to embodiments herein, such as where there is a positive net economic impact, such as in reduction of water usage, energy usage, and/or capital or operating expenses (CAPEX and OPEX, respectively) for the facility.

Embodiments herein may result in a concentrated $CO_2$ stream having a $CO_2$ concentration of greater than 40 vol %, as noted above, including high purity $CO_2$ streams, such as greater than 90 vol %, for example. Some embodiments herein may provide a concentrated $CO_2$ stream having a moderate purity of $CO_2$, such as less than 85 vol %, less than 80 vol %, less than 75 vol % or less than 70 vol %. It has been found that effective sequestration may be achieved through pre-conditioning to fit a wide range of $CO_2$ concentrations, depending on water and energy availability, as well CAPEX and OPEX of the facility. The ability to process lower purity $CO_2$ streams according to embodiments herein may provide significant advantages in processing options, costs, and other conventional factors, especially as compared to other carbon sequestration processes that require greater than 99 vol % $CO_2$ to be cost effective.

Since the relationship between the $CO_2$ partial pressure and its solubility in water is non-linear, a relatively moderate increase of the concentration of $CO_2$ in the flue gas can improve significantly the cost effectiveness of the CSB dissolution method by significantly reducing water demand. For example, an increase of the concentration of $CO_2$ from 10 to 40 vol % will reduce the quantity of water needed by a factor of 4, and if $CO_2$ concentration is increased to 60 vol %, water demand will drop to about one sixth of the volume needed to trap $CO_2$ from a 10 vol % mixture. This significant reduction of fluid volume will not only reduce the demand of energy for pumping and compression but also the number of disposal wells.

Accordingly, it is further envisioned that CSB as described herein can apply to other processes and may be implemented at any industrial facility (e.g., power plants, refineries, water desalination plants, cement plants, smelters, etc.) where CSB can be utilized to reduce/eliminate the facilities' $CO_2$ (and $H_2S$) emissions, even in facilities where the $CO_2$ concentration in the waste byproduct stream is low and conventional sequestration by CSB is not practical. This is conditional upon the proximity of said facilities to accumulations of reactive rocks, such a basalt, of sufficient volume, thickness, and water saturation volume, to allow the use of CSB for $CO_2$ sequestration.

In such embodiments, it is envisioned to apply a separate $CO_2$ (acid gas) pre-concentration step. The purpose of this step is to increase $CO_2$ concentrations to the medium-high ranges, rather than to the near 100 vol % $CO_2$ concentrations required for conventional CCS. Because the $CO_2$ water scrubbing mechanism may also be intended to sequester acid sulphur gases (e.g., $H_2S$), the $CO_2$ concentration method does not need to remove such impurities. This step can employ any conventional method or technology for pre-concentrating $CO_2$, such as, but not limited to, absorption based methods using monoethanolamine (MEA) solutions, adsorption based methods such as Pressure Swing Adsorption (PSA), metal-organic framework (MOF), membrane gas separation, and chemical looping combustion, among other. Further, multiple of the same unit may be used in series, multiple different units may be used in series, and parallel pre-concentrating steps may be used. For example, two PSAs may be used in series, with two series of PSAs being used in parallel. Additionally, two PSAs may be used with an MEA, MOF, membrane gas separation, or chemical looping combustion unit either before, after, or in between the PSAs.

Such processes may increase the $CO_2$ concentration by removing one or more of water vapor, nitrogen, nitrogen oxide, CO, etc. In other embodiments, such processes may increase the $CO_2$ and $H_2S$ concentration by removing one or more of water vapor, nitrogen, nitrogen oxide, CO, etc.

The increase in $CO_2$ concentration from 7-10 vol %, as would typically be found in low concentration byproduct streams, to above 40 vol % can be achieved by introducing a $CO_2$ (or a $CO_2$ and $H_2S$) concentration unit to the water scrubbing process at a CSB facility. This may reduce the scrubbing facility's operational costs (OPEX) by reducing the volume of waste gas to be processed, the volume of water needed to dissolve/scrub $CO_2$ and consequently the energy needed for pumping and compressing both the water and the gas. That in turn may also reduce capital expenditure costs (CAPEX) by reducing the size of the scrubber facility, the diameter of the delivery pipeline(s) as well as the number of disposal wells needed.

Figure 2:
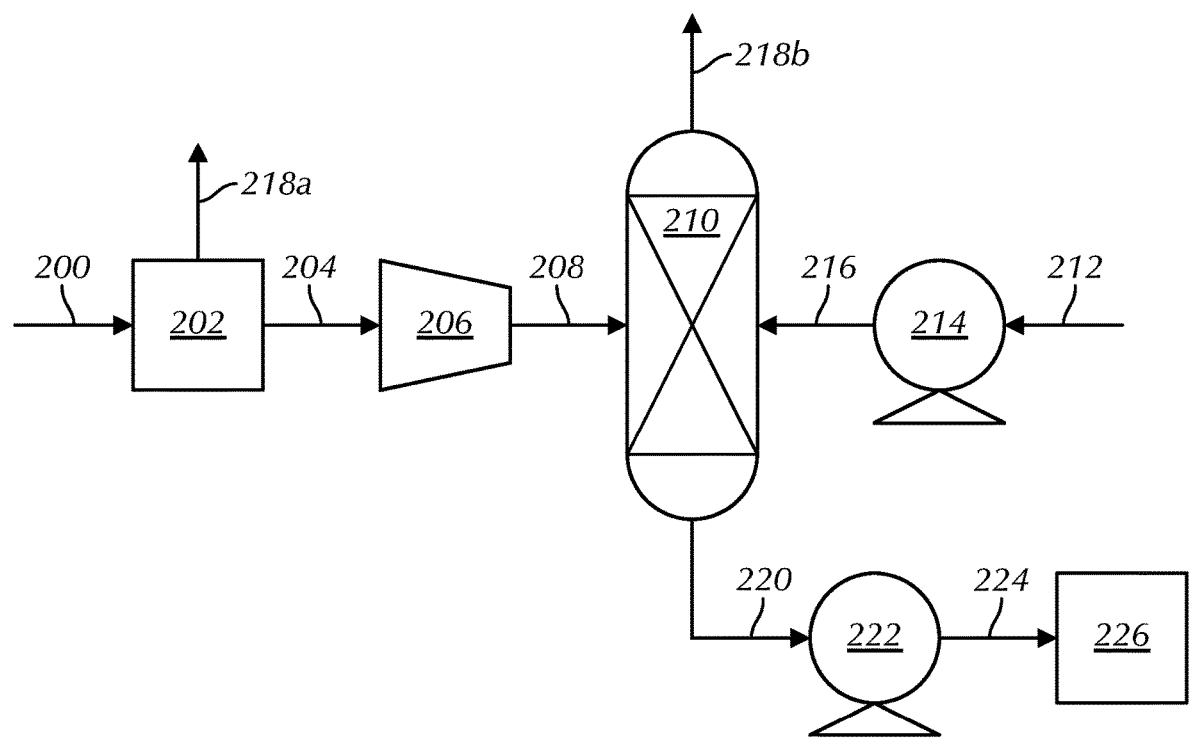
FIG. 2 shows a schematic flow chart for an example embodiment of a $CO_2$ sequestration using a pre-concentrator.

FIG. 2 shows a schematic of the system disclosed herein in which a $CO_2$ pre-concentrator is used to prepare a $CO_2$ stream for water scrubbing and disposal in reactive rocks. The $CO_2$ stream may be a $CO_2$-lean waste gas stream from a power production facility, a desalination plant, a refinery, a chemical production plant, an ore smelting plant, a cement production plant, a logging plant, a landfill, a fertilizer production plant, or other industrial facilities. A $CO_2$-lean stream 200 from any suitable source may be fed to the $CO_2$ pre-concentrator 202, which may produce a concentrated $CO_2$ stream 204 and an insoluble gas stream 218a. The concentrated $CO_2$ stream may then be fed to a compressor 206 to increase the pressure of the concentrated $CO_2$ stream, producing a pressurized $CO_2$ stream 208. The concentrated $CO_2$ stream 208 may then be fed to a $CO_2$ scrubbing unit, where the gases are contacted with water to dissolve the $CO_2$. $CO_2$ scrubbing unit 210 may also be operable to separate $N_2$, Ar, and other insoluble or inert gases from $CO_2$ and other acid gases, such as hydrogen sulfide ($H_2S$) and/or sulfur dioxide ($SO_2$), while dissolving $CO_2$ and other acid gases, such as $H_2S$, in water. A water inlet 212 is fed to a water pump 214 with the pressurized water 216 being used as the scrubbing medium. The insoluble gases (or undissolved byproducts) are collected in outlet 218b, and may be sent to further purification, utilization, vented to atmosphere, or a combination thereof, as necessary.

$CO_2$ and additional gases, such as acid gases, are dissolved in the water and exit scrubbing unit 210 via outlet 220. The $CO_2$-water mixture may then be fed to a pump 222 and injected via flow line 224 into basaltic formation 226, such as through an injection well, to form solid precipitated metal carbonates per Equations 5-9. Solid carbonate or sulfide nodules form in basalt around injection wells and extend outwardly from the injection wells.

As described above, embodiments herein may provide for the efficient sequestration of carbon from both $CO_2$-lean waste streams and synergistic hydrogen production.

The singular forms "a," "an," and "the" include plural referents, unless the context clearly dictates otherwise.

In the drawings and specification, there have been disclosed embodiments of systems and methods for reducing or eliminating greenhouse gas emissions, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed as new and desired to be protected by Letters Patent of the United States is:

1. A method for reducing greenhouse gas emissions, the method comprising the steps of:

producing a waste gas stream comprising from greater than 0 vol % to less than 20 vol % carbon dioxide;

pre-concentrating the waste gas stream to increase a concentration of carbon dioxide, producing a concentrated byproduct stream comprising more than 40 vol % carbon dioxide;

dissolving carbon dioxide contained in the concentrated byproduct stream in water, producing a dissolved byproduct stream and an undissolved byproduct stream;

injecting the dissolved byproduct stream or a portion thereof into a reservoir containing mafic or ultramafic rock; and allowing components of the dissolved byproduct stream to react in situ with components of the mafic rock to precipitate and store components of the byproduct stream in the reservoir.

2. The method according to claim 1, wherein the waste gas stream comprises from 4 vol % to 12 vol % carbon dioxide.

3. The method according to claim 1, where the mafic rock comprises basaltic rock.

4. The method according to claim 1, where the step of pre-concentrating comprises one or more selected from the group consisting of monoethanolamine (MEA) solution absorption, pressure swing adsorption (PSA), metal-organic framework (MOF), membrane gas separation, and chemical looping combustion.

5. The method according to claim 4, wherein the step of pre-concentrating increases the $CO_2$ concentration from less than 40 vol % to a concentration of 40 vol % to 75 vol %.

6. The method according to claim 5, wherein the step of pre-concentrating increases the $CO_2$ concentration from less than 20 vol % to a concentration of 40 vol % to 70 vol %.

7. The method according to claim 1, wherein the waste gas stream additionally comprises one or more of $H_2S$, $SO_2$, Ar, and $N_2$.

8. The method according to claim 7, wherein the dissolving step further comprises dissolving $SO_2$ and/or $H_2S$ in the water, the Ar and/or $N_2$ from the waste stream being recovered with the undissolved byproduct stream.

9. The method according to claim 1, where the step of producing a waste gas stream includes steam reforming or partial oxidation.

10. The method according to claim 1, where the reservoir is between about 250 m and about 500 m below the surface and is between about 150° C. and about 280° C.

11. The method according to claim 1, where the reservoir is between about 350 m and about 1,500 m below the surface and is less than about 325° C.

12. A method for sequestering $CO_2$, the method comprising the steps of:
    producing a product gas comprising carbon dioxide and one or more selected from the group consisting of $H_2S$, $SO_2$, Ar, and $N_2$ from a hydrocarbon fuel source;
    pre-concentrating the product gas in a pre-concentrator to increase a concentration of carbon dioxide from less than 20 vol % to above 40 vol %, producing a concentrated byproduct stream;
    dissolving the concentrated byproduct stream in water, producing a dissolved byproduct stream comprising water, $CO_2$, and any dissolved $H_2S$ and/or $SO_2$;
    injecting the dissolved byproduct stream into a reservoir containing mafic or ultramafic rock; and
    allowing the $CO_2$ and any $H_2S$ and $SO_2$ to react in situ with components of the mafic rock to precipitate and store components of the byproduct stream in the reservoir.

13. The method according to claim 12, further comprising collecting any Ar and $N_2$ from an overhead outlet of the pre-concentrator.

14. The method according to claim 12, where the step of pre-concentrating comprises one or more selected from the group consisting of monoethanolamine (MEA) solution absorption, pressure swing adsorption (PSA), metal-organic framework (MOF), membrane gas separation, and chemical looping combustion.

* * * * *